Oct. 18, 1955 C. J. FITCH 2,721,229

SIGNAL TRANSMITTING PHOTOELECTRIC READER

Filed Dec. 22, 1951 8 Sheets-Sheet 1

Inventor
CLYDE J. FITCH
By Geoffrey Knight
Attorney

SIGNAL TRANSMITTING PHOTOELECTRIC READER

Filed Dec. 22, 1951 8 Sheets-Sheet 2

INVENTOR
CLYDE J. FITCH
BY Geoffrey Knight
ATTORNEY

INVENTOR
CLYDE J. FITCH
BY Geoffrey Knight
ATTORNEY

Oct. 18, 1955 C. J. FITCH 2,721,229

SIGNAL TRANSMITTING PHOTOELECTRIC READER

Filed Dec. 22, 1951 8 Sheets-Sheet 4

INVENTOR
CLYDE J. FITCH
BY Geoffrey Knight
ATTORNEY

Oct. 18, 1955 C. J. FITCH 2,721,229

SIGNAL TRANSMITTING PHOTOELECTRIC READER

Filed Dec. 22, 1951 8 Sheets-Sheet 5

INVENTOR
CLYDE J. FITCH
BY Geoffrey Knight
ATTORNEY

SIGNAL TRANSMITTING PHOTOELECTRIC READER

Filed Dec. 22, 1951 8 Sheets-Sheet 6

INVENTOR
CLYDE J. FITCH
BY Geoffrey Knight
ATTORNEY

Inventor
CLYDE J. FITCH
BY Geoffrey Knight
Attorney

Oct. 18, 1955 C. J. FITCH 2,721,229

SIGNAL TRANSMITTING PHOTOELECTRIC READER

Filed Dec. 22, 1951 8 Sheets-Sheet 8

Inventor
CLYDE J. FITCH

By Geoffrey Knight

Attorney

United States Patent Office 2,721,229 Patented Oct. 18, 1955

2,721,229

SIGNAL TRANSMITTING PHOTOELECTRIC READER

Clyde J. Fitch, Endicott, N. Y., assignor to International Business Machines Corporation, New York, N. Y., a corporation of New York Application December 22, 1951, Serial No. 262,966

6 Claims. (Cl. 178—17)

This invention relates to improvements in a code signal transmitting device.

One object is to provide an improved device for reading code symbols arranged in transverse lines on a page.

A more particular object is to provide a code signal transmitting device which can read groups of code symbol elements arranged in transverse lines on a page and thereby be controlled to emit signals suitable for the operation of a start-stop type receiver.

In line with the foregoing object, it is a more specific object to provide a carriage operating means adapted to move a code reading device positively and at uniform velocity across the page, so that the time spacing of signal elements is determined by the time spacing of the reading of code symbol elements caused by the movement of the carriage.

A further object is to provide a code signal transmitting device including reading means capable of reading, automatically in succession, a plurality of lines of code symbols arranged one line below another, the signals being transmitted while the reading means moves in one direction and being suppressed while the reading means moves in the reverse direction.

A particular object, realized in a preferred embodiment of the invention to be described, is to provide an improved signal transmitting device having the attributes referred to in the foregoing paragraph, wherein the reading of an unmarked area of paper exceeding a predetermined length initiates line spacing of the record and a return movement of the reading means.

A preferred embodiment of the invention includes means to clutch the reading means to drive means adapted to move it at a uniform velocity in one direction, and means constantly urging the reading means to return to a starting position, which last means becomes effective as soon as the clutch is released.

Other objects of this invention will be pointed out in the following description and claims, and illustrated in the accompanying drawings, which disclose, by way of example, the principle of the invention and the best mode, which has been contemplated, of applying that principle.

Figure 6:
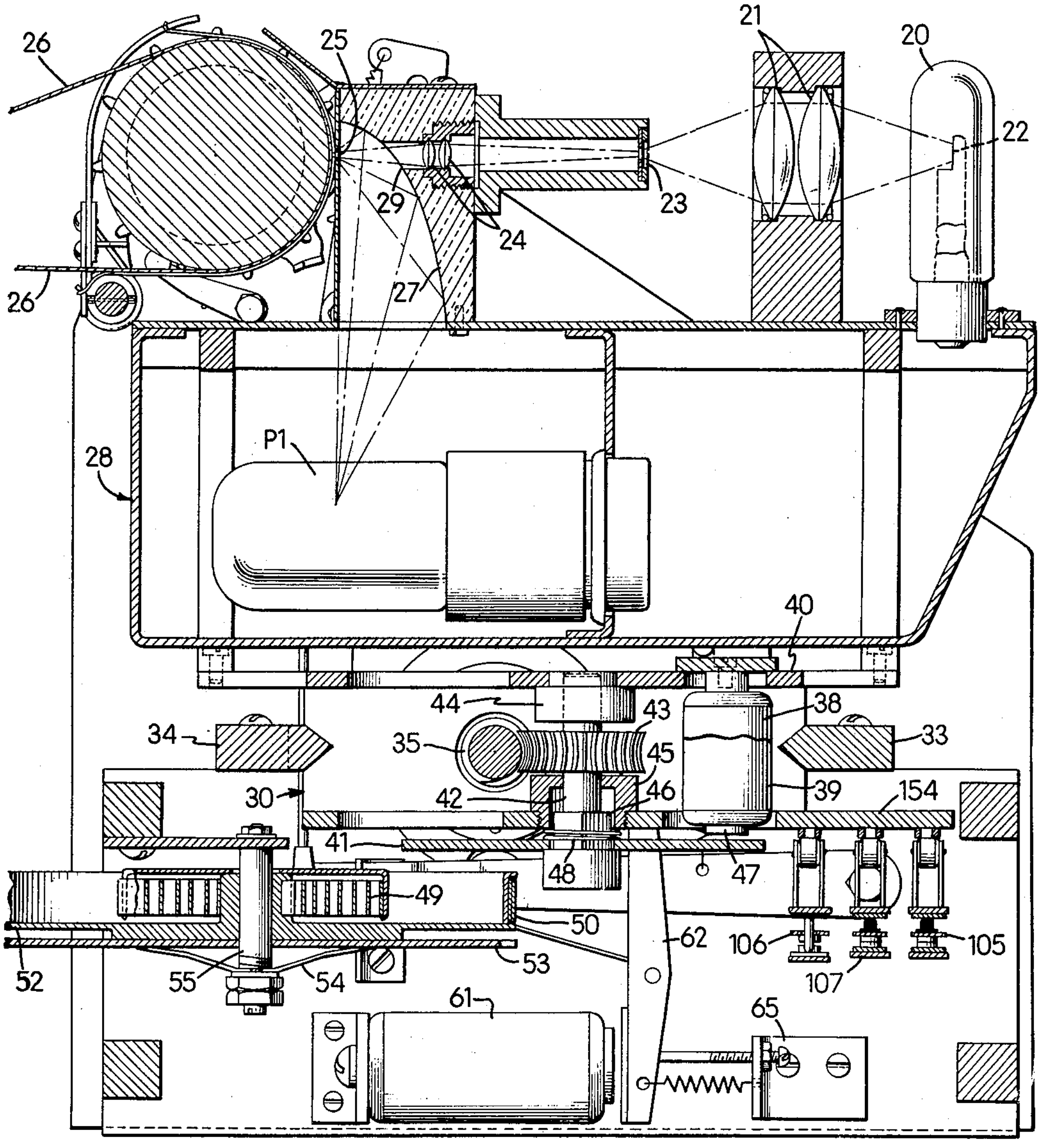
Fig. 6 is a sectional plan view of the optical system and the carriage advancing means taken along the lines 6—6 of Fig. 5.

Referring to Fig. 6, the optical system of the reading unit 28 is shown to comprise a light source 20; a pair of converging lenses 21 used to condense the light from the light source filament 22; a light aperture 23; a projection lens 24 for reducing the image of said aperture 23, and for projecting the said image upon the reading surface 25 of a document 26; and an elliptical mirror 27 whose reflecting surface gathers the light rays reflected from the reading surface 25 of document 26 so as to focus the said light rays upon a light sensitive element of a photoelectric tube P1. The light energy emitted by light source 20 and transmitted onto the reading surface 25, is passed through an aperture 29 in the elliptical mirror 27.

*Carriage advancing means*

Figure 8:
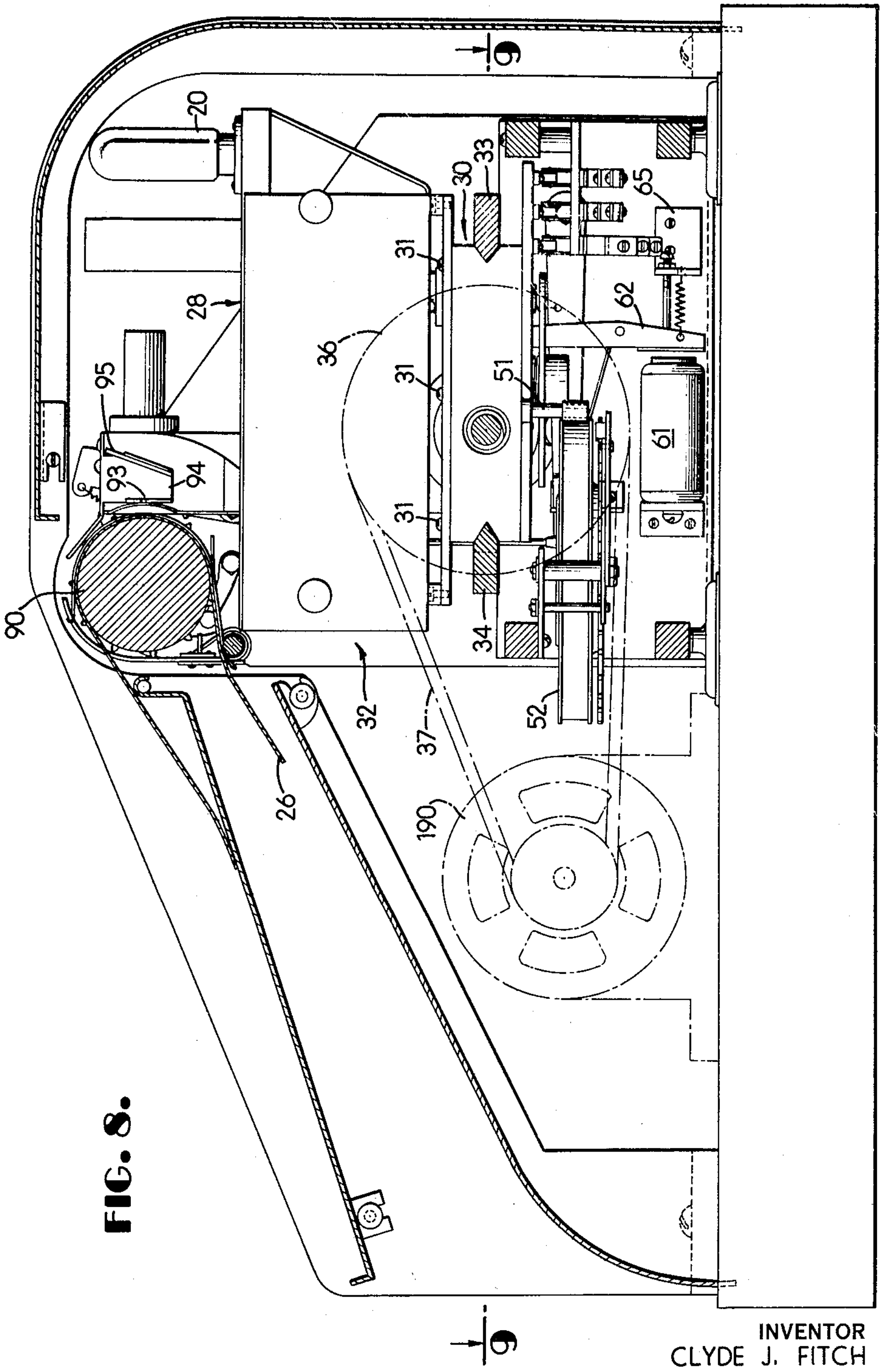
Fig. 8 is a sectional view taken along the lines 8—8 of Fig. 5.

As is shown in Fig. 8, the reading unit 28 is fixed to a mount 30 by means of a plurality of holding screws 31. For the purpose of this description, the combination of the reading unit 28 and its mount 30 will hereinafter be termed a carriage 32. The mount 30 is slideably attached to a pair of guide rails 33 and 34 which are fixed to the photoelectric reader main frame. As the description advances, it will be shown that the carriage 32 (Fig. 5) is propelled laterally from left to right at a continuous and uniform rate of speed by a worm screw 35 so that the reading unit 28 may scan the code symbols printed on the surface of a document 26, and returned from right to left after scanning each line of code symbols under the urging of a high speed conventional typewriter tabulating mechanism operating as a yielding carriage return mechanism.

Figure 5:
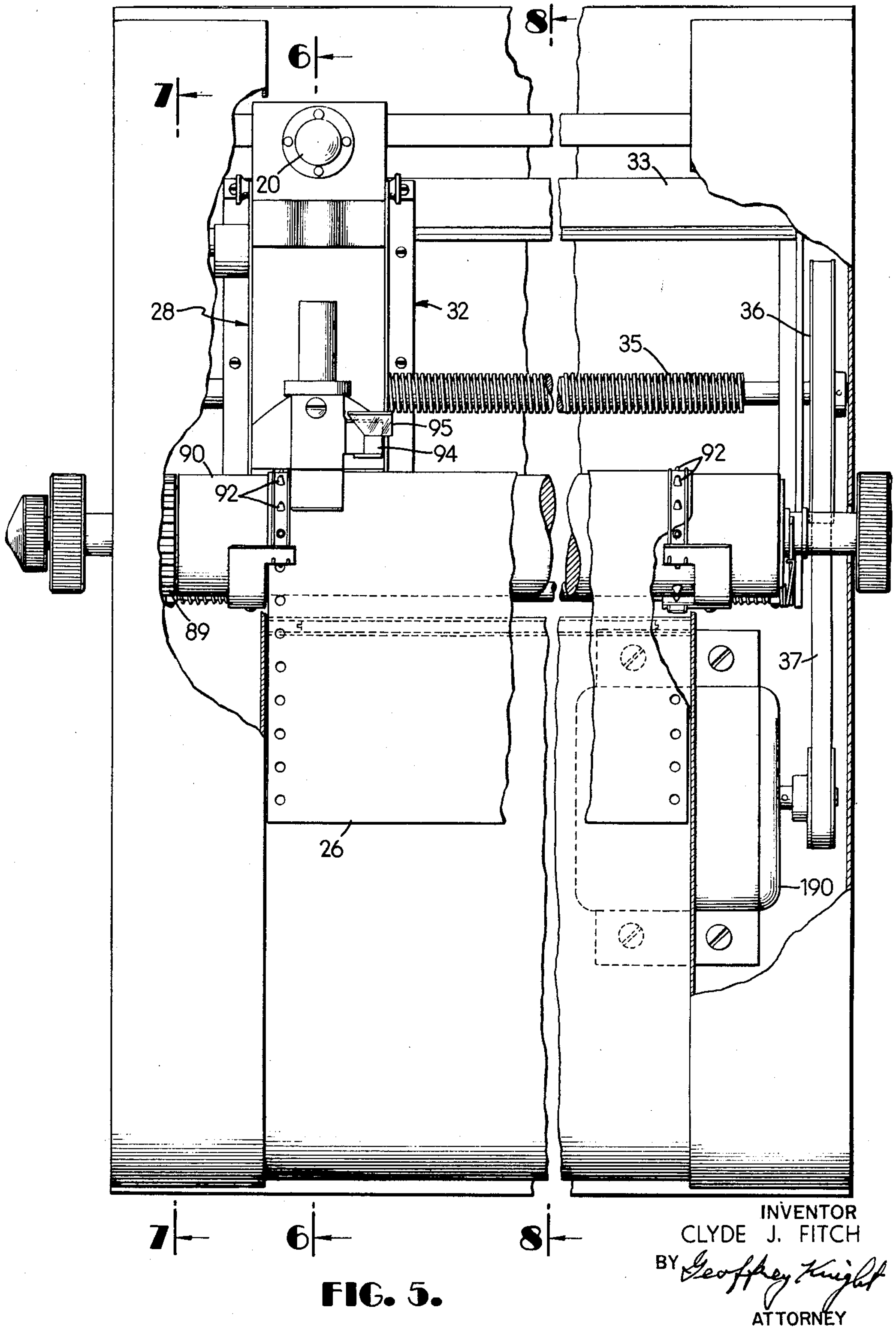
Fig. 5 is a fragmentary top view of the photoelectric reader unit.

The driving worm screw 35 shown in Fig. 5, is fixed to a pulley 36 and continuously rotated at a uniform angular velocity through a belt 37 by means of a synchronous type motor 190; the said worm screw 35 is also connected to carriage 32 by means of a magnetically controlled friction disc clutch. Referring to Fig. 6, the said disc clutch is shown to comprise a pair of electromagnets 38 and 39 mounted on a member 40 fixed to the frame of carriage 32, and a circular disc type armature 41 attached to a shaft 42 journaled in bearings 44 and 45. In addition thereto, a gear 43 actuated by the continuously rotating driving worm screw 35 is fixedly attached to shaft 42 so as to rotate said shaft and disc armature 41.

Disc armature 41 is free to move a limited amount along the axis of the extended rectangular end 46 of shaft 42 so that upon the energization of the coils of electromagnets 38 and 39, disc armature 41 is attracted to the metal cores 47 of the said electromagnets against the action of a compression spring 48. Upon energization of the coils of electromagnets 38 and 39, the disc armature 41 is held against cores 47 by magnetic forces set up by the said electromagnets so that the said disc armature is maintained stationary relative to the said electromagnets due to the frictional forces created by contact between the said disc and cores. As a result, gear 43 whose teeth are in mesh with those of the driving worm screw 35, is also prevented from turning. Thus, as worm screw 35 continues to rotate, the rotary motion of gear 43 is translated into an axial motion along the longitudinal axis of the worm screw 35.

Whenever the coils of electromagnets 38 and 39 are energized, the carriage 32 is caused to travel with gear 43 along the rails 33 and 34 from left to right, as shown in Fig. 5, at a speed determined by the uniform angular velocity of worm screw 35 and the lead of the threads cut thereon. This speed is set so as to be proper for reading code symbols to be referred to presently, at the rate of approximately 100 five-letter words per minute.

*Carriage return means*

Figure 9:
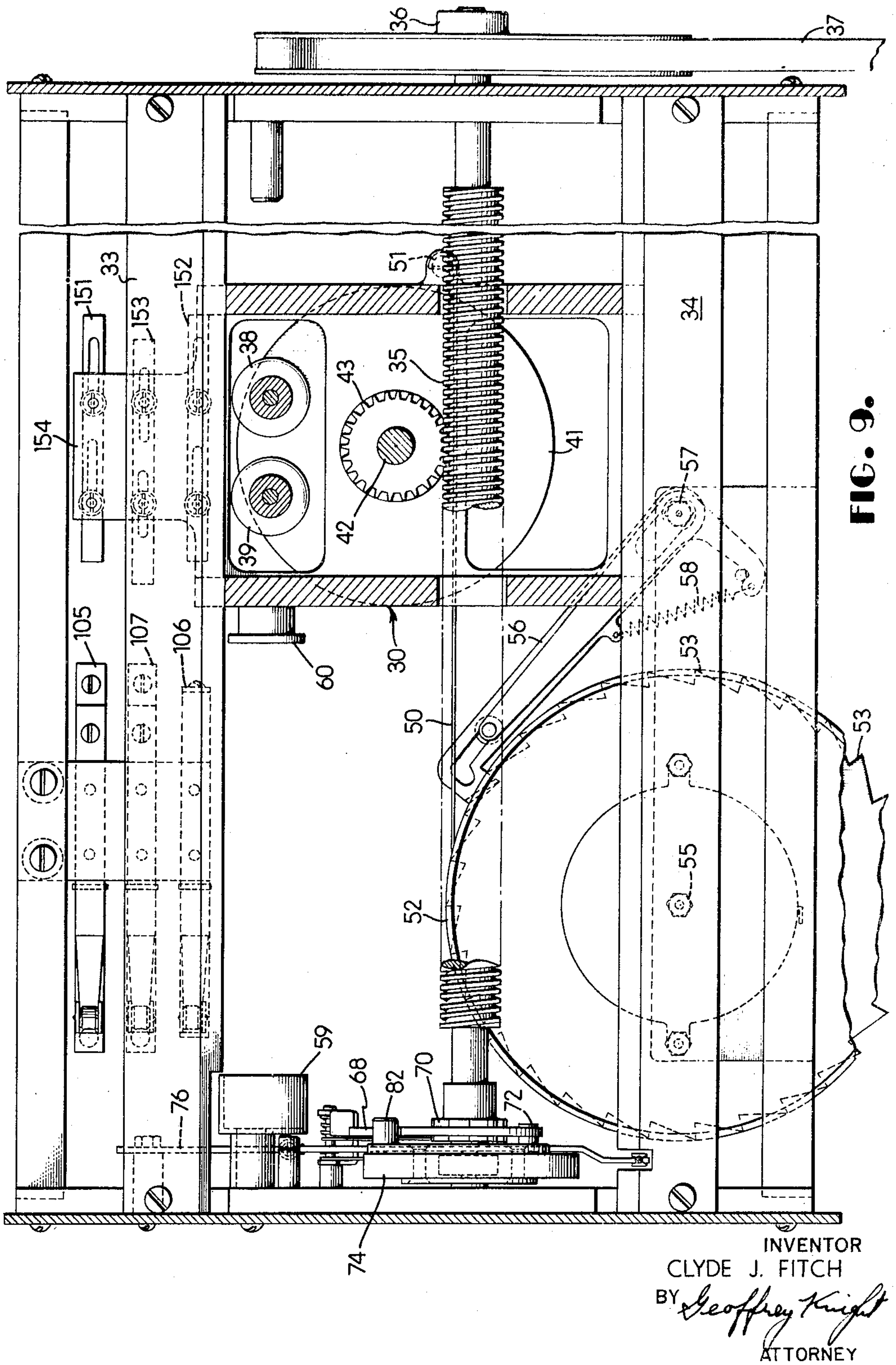
Fig. 9 is a sectional view taken along the lines 9—9 of Fig. 8.

After completely scanning a line of code symbols, the coils of electromagnets 38 and 39 are de-energized by a means to be described hereinafter. When this occurs, disc armature 41 is permitted to return to an unattracted position by the action of spring 48 (Fig. 6), thereby rendering the magnetically controlled friction disc clutch inoperative. Spring 48 is used to overcome any residual magnetism that might tend to keep disc armature 41 attracted to the said cores 47 of electromagnets 38 and 39 after their coils are de-energized. As the yielding carriage return mechanism shown in Figs. 6 and 9, exerts, by means of a wound internal spring 49, a considerable pull upon the carriage 32 through a tape 50, disengagement of the said disc clutch permits the said return mechanism to draw the carriage 32 back to its starting point, i. e., the left terminus, at considerable speed. The tape 50 is connected, at one end, to a stud 51 (Figs. 8 and 9) fixed to the mount 30, and, at its other end, to a disc 52 which is also attached to spring 49. The velocity with which the carriage 32 returns to the starting point is also determined in part by a friction type governor comprising a toothed disc 53 and a plurality of leaf springs 54 which maintain constant contact between the under surface of disc 52 and the upper surface of toothed disc 53. Referring to Fig. 9, upon disengagement of the said clutch, disc 52 is caused to rotate in a counterclockwise direction about its shaft 55 due to spring 49 and attempts to carry along with it toothed disc 53 due to a friction force created by the aforestated contact between the discs 52 and 53. However, as disc 53 attempts to rotate in a counterclockwise direction, the notched end of lever 56 engages one of a plurality of notches on the periphery of disc 53 in order to keep the said toothed disc 53 stationary. Lever arm 56 positioned by means of tension spring 58 so as to be in constant contact with the said notches on toothed disc 53, is freely mounted on stud 57 in order to permit a clockwise rotation of disc 53 while carriage 32 is advanced from left to right. To cause quick acting uniform deceleration of carriage 32 at the left terminus of the photoelectric reader, a compressed air dashpot comprising a cylinder 59 and a plunger 60 is provided.

*Document indexing means*

Figure 7:
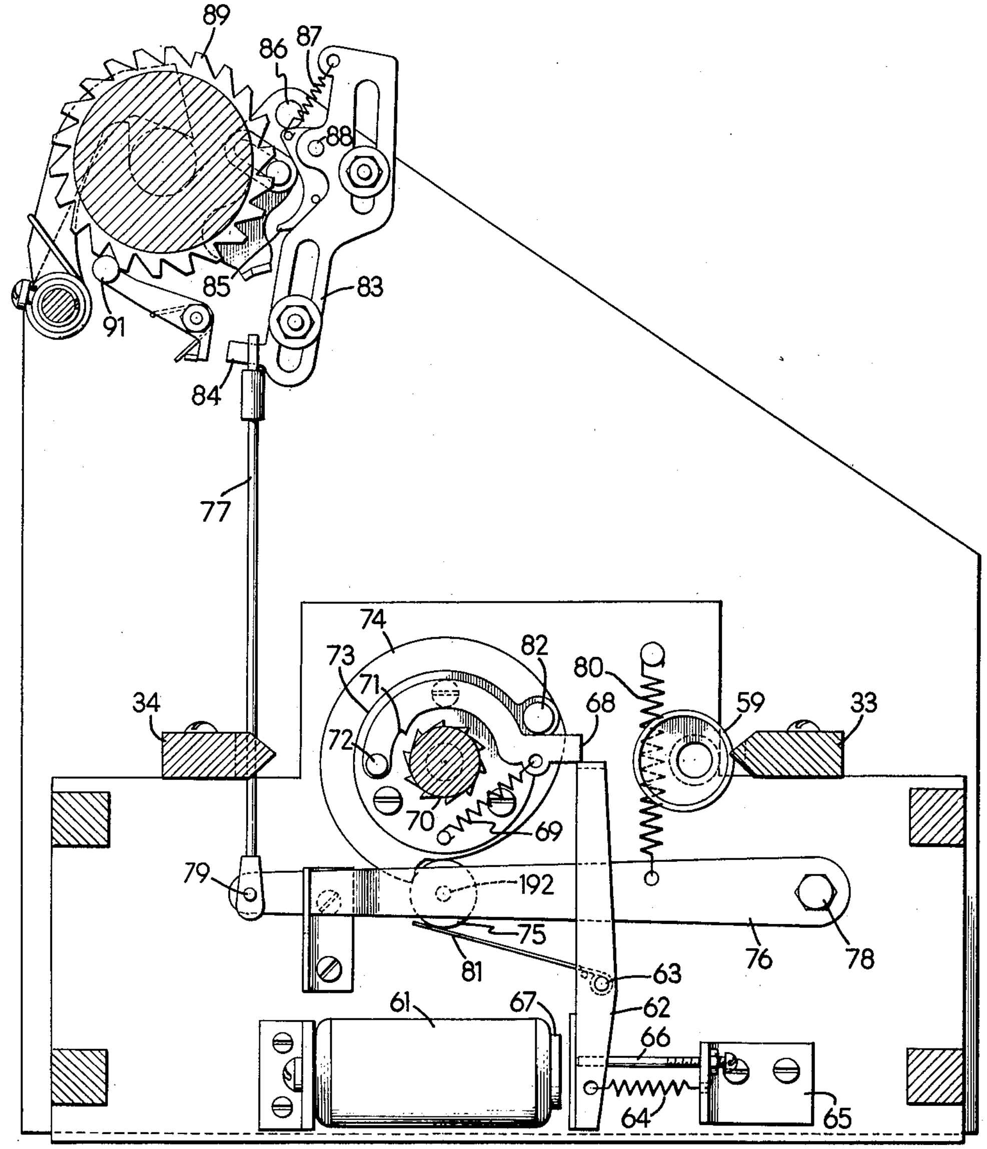
Fig. 7 is a sectional plan view of the platen indexing means taken along the lines 7—7 of Fig. 5.

Concurrently with the return of carriage 32 to its starting position, electrical means to be described hereinafter momentarily energizes the platen indexing magnet coil 61 shown in Fig. 7. Thus, armature 62 which is freely mounted on a stud 63 pivots clockwise against the action of an armature return spring 64 connected, at one end, to a bracket 65 fixed to the photoelectric reader main frame, and, at its other end, to armature 62. An adjusting screw 66 is attached to bracket 65 in order to provide a means whereby the normal position of armature 62 relative to core 67 may be varied. Upon pivoting clockwise, the extended end of armature 62 disengages the extended end of a dog 68 so as to unlatch the said dog. Dog 68 is urged by a spring 69 toward a continuously rotating ratchet wheel 70 fixedly attached to the extended shaft of driving worm 35 (Fig. 9). In so doing, a notch 71 on dog 68 engages one of the notches on ratchet wheel 70. As the dog 68 is freely mounted on a stud 72 which is fixed to a member 73, and as the member 73 is fixed to an eccentric cam 74 by means of a plurality of holding screws, the clockwise turning motion of ratchet wheel 70 is thereby transmitted to cam 74. During the clockwise rotation of cam 74, a cam follower roller 75 freely mounted on a stud 192 fixed to a lever arm 76 causes a link 77 to move downwardly. Lever arm 76 is connected to the photoelectric reader main frame by a stud 78, and to the link 77 at connecting pin 79. The cam follower roller 75 maintains constant surface contact with cam 74 by the combined action of the lever arm return spring 80 and the cam follower roller spring 81.

Due to the fact that magnet coil 61 is energized only momentarily and de-energized prior to the completion of a single revolution of the eccentric cam 74 as will be more completely described hereinafter, the dog 68 is latched after one revolution of the said cam 74 when the extended end of dog 68 engages the extended end of armature 62. Eccentric cam 74 is stopped instantly after completing a single revolution when stop stud 82 fixed to cam 74 strikes the extended end of the now latched dog 68. Upon completing a single revolution of said cam 74, the roller 75 drops into a low cut on cam 74 so as to cause link 77 to move upwardly. Thus, it may be stated in summation that one revolution of cam 74 causes the link 77 to oscillate vertically just once.

As the said link 77 is moved downwardly, a bracket 83 connected by its extended end 84 to link 77 is also caused to move downwardly. This movement releases pawl 85 from its keeper 86 and permits a tension spring 87 to rotate the said pawl in a clockwise direction about a stud 88 fixed to bracket 83. The aforesaid action causes pawl 85 to engage the nearest tooth of a gear 89 attached to a platen 90 (Fig. 5) so as to index the said platen one whole space. Spring actuated detent 91 coacts with the teeth of gear 89 in order to prevent any partial line space movement by the platen 90.

*Means for alignment of document*

Referring to Fig. 5, a plurality of pins 92 fixed to platen 90 project through alignment holes in document 26 so that the said document is moved line by line along with platen 90 as the said platen is indexed.

Figure 1:
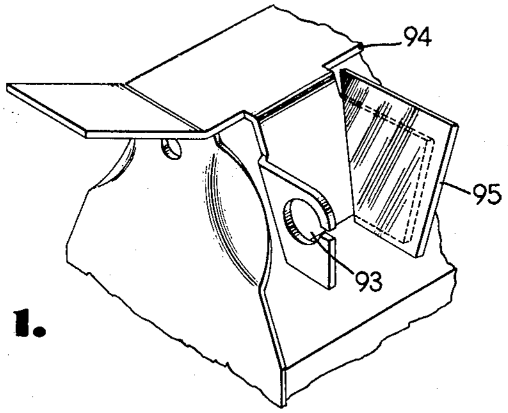
Fig. 1 is a perspective view of the document alignment means of the photoelectric reader unit.
Figure 2:
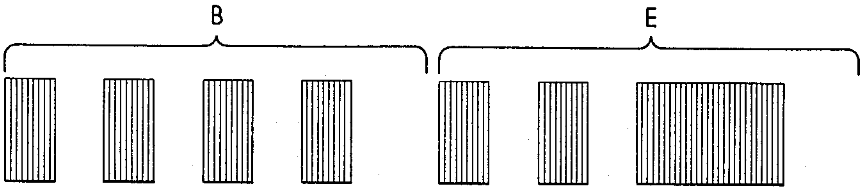
Fig. 2 is an enlarged view of the code symbols comprising code marks for the characters B and E, respectively, as they appear printed on a document.

Vertical alignment of the document 26 around the platen 90 is accomplished in a manner usual to typewriter mechanisms. In addition thereto, exact vertical alignment of the code marks, such as shown in Fig. 2, with the optical system of the reading unit 28 may be had. Referring to Figs. 1 and 8, the method used to accomplish the aforesaid exact alignment is to rotate platen 90 holding document 26 until the code marks are centered in an aperture 93 formed by a bracket 94 when viewed by the operator in a mirror 95. The said bracket 94 and mirror 95 are mounted on the right side of the reading unit 28 as shown in Fig. 5.

A complete understanding of the photoelectric reader will show that horizontal alignment of the code symbols with the optical system of reading unit 28 is automatically acquired once the aforesaid vertical alignment is obtained.

*Signal means*

Figure 4:
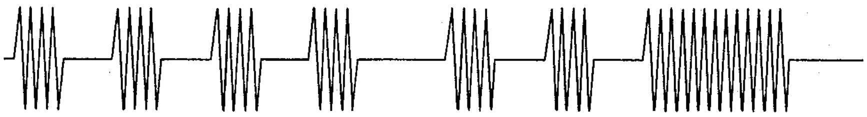
Fig. 4 is an illustration of the modulated audio frequency carrier waves, i. e., the tone signals, for the characters B and E, respectively.

A complete tone signal for one character or function, as shown in Fig. 4, comprises a start signal element, six code signal elements and a stop signal element. A tone signal having any other desired number of code signal elements may be used although it would be necessary to suitably alter the electronic receiving unit circuit to be described hereinafter. Referring to Fig. 2, a code symbol printed on a document 26 comprises a start element, six code elements and a stop element. In the complete code symbol for the character "B" the start element is a marking or dark area, the code elements 2, 4 and 6 are also markings, the code elements 1,3 and 5 are spacings or light areas, and the stop element is also a spacing. In the complete symbol for the character "E" the start element is a marking, the code elements 2, 4, 5 and 6 are markings, the code elements 1 and 3 are spacings, and the stop element is a spacing. Similarly, any character or machine function may be represented by a combination of code element markings and spacings. As shown in Fig. 4, the marking or dark area code symbol elements are characterized by tone while the spacing or light area code symbol elements are characterized by an absence of tone. Such a signal is more efficient because the continuous wave signals will be "off" during the stop-period and while the photoelectric reader is idle. The time duration of the start signal element and each of the six code signal elements is the same due to the equal spacing of their corresponding marking or spacing elements shown in Fig. 2 and the continuous and uniform advancement of the carriage 32. As to be described hereinafter, the entire receiving unit circuit is restored within a time duration of one code signal element so that the stop signal may have a minimum time duration of one code signal element. However, the preferred time duration of the stop signal element is that of 1½ code signal elements.

Although by no means intended to be a limitation, the preferred spacing is ten characters to the inch so that there are ten corresponding code symbols per inch printed on the document 26. Due to the arrangement of the code symbol elements, the spacing between two complete code symbols is negligible and may be considered a part of the stop mark element. However, as the description advances, it will be shown that the maximum spacing between two adjacent complete code symbols may be equal to that of aproximately one code symbol without affecting normal photoelectric reader operation.

*Reading device and transmitter circuit description*

Figure 10:
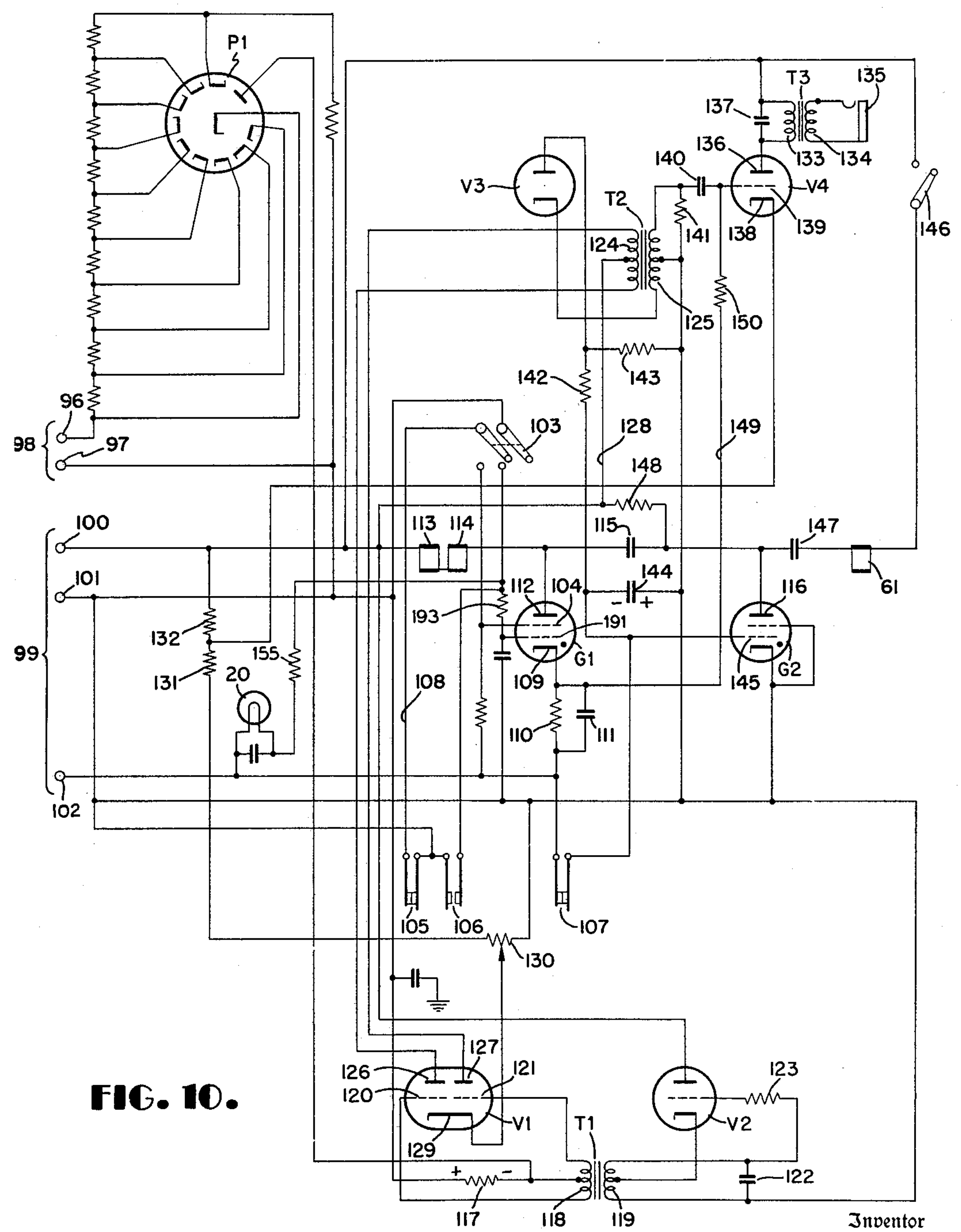
Fig. 10 is a schematic wiring diagram of the photoelectric tube controlled signal transmitting device.

Refering to Fig. 10, the voltage necessary to operate photoelectric tube P1 is obtained from a voltage source 98 wherein terminals 96 and 97 are at suitable operating potentials; e. g., zero and +800 volts, respectively. A second voltage source 99 comprising terminals 100, 101 and 102 wherein the said terminals have a potential, for example, of +143.5, +13.5 and zero volts, respectively, is also required.

Upon closure of switch 103, a positive potential from terminal 101 is applied to the shield grid 104 of gas tube G1 through a switch contact 105 and a wire 108, and a positive potential from terminal 101 is applied to the control grid 191 through a resistor 193 so as to fire tube G1. As the description advances, it will be shown that contact 105 is closed only at the beginning of a line of code symbols to be read or scanned when the carriage 32 is at the left terminus, and is opened immediately thereafter as soon as carriage 32 moves to the right. Cathode 109 of tube G1, preferably a thyratron type 2050 tube, is connected to terminal 102 through a biasing resistor 110 and a by-pass condenser 111, whereas plate 112 is connected to terminal 100 through the coils 113 and 114 of the disc clutch electromagnets 38 and 39, respectively. Gas tube G2, preferably a thyratron type 2050 tube, is extinguished, if conducting, when tube G1 fires, due to a negative going pulse transmitted through a 0.5 microfarad commutating condenser 115 which is connected, at one end, to plate 112, and, at its other end, to plate 116. In addition thereto, upon closure of switch 103, the circuit to energize light source 20 is completed.

Due to the fact that the synchronous type drive motor 190 operates continuously with a constant angular velocity, and the coils 113 and 114 of the aforedescribed carriage disc clutch are energized during the time that tube G1 conducts, the carriage 32 is propelled from left to right at a continuous and uniform rate of speed.

Figure 3:
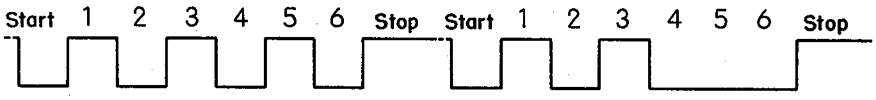
Fig. 3 is an illustration of the photoelectric tube output voltage wave-form for the characters B and E, respectively.

The photoelectric tube load resistor 117 in the anode circuit of tube P1 is also connected, at one end, to the center-tap of the secondary winding 118 of transformer T1, and, at its other end, to terminal 101. As the carriage 32 is advanced at a uniform speed from left to right, the reader photoelectric tube P1, preferably an RCA type 931-A multiplier tube, translates the varying light and dark areas of the code symbol elements, some of which are shown in Fig. 2, into voltage pulses shown in Fig. 3. When tube P1 senses a dark area, the said tube does not conduct so that the voltage drop across load resistor 117 of tube P1 is at a minimum value, but when tube P1 senses a light area, it does conduct so that the voltage drop across load resistor 117 is at a maximum value. Thus, the voltage variations across resistor 117 due to correspondingly varying light and dark areas of the printed code symbols are applied to the center-tap of winding 118 where they have the effect of biasing the control grids 120 and 121 of the vacuum tube V1 positively and negatively in respective relation to the black and white areas sensed; i. e., when photoelectric tube P1 senses a dark area tube V1 is rendered conductive, and when photoelectric tube P1 senses a light area, said tube V1 is biased beyond cut-off. The polarity of the voltage drop across resistor 117 due to the photoelectric tube voltage pulse is indicated in Fig. 10.

Vacuum tube V2 in combination with the primary winding 119 of transformer T1, condenser 122 and resistor 123 comprise a Hartley type oscillator. The said oscillator output frequency causes continuous waves of audio frequency voltage to be impressed along with the pulsing voltage output of photoelectric tube P1 across the secondary winding 118 and onto the grids 120 and 121. Hence, the effect of the aforesaid voltage combination upon the control grids 129 and 121 causes a series of audio frequency waves modulated or keyed by the photoelectric tube P1 voltage pulses to be impressed across the primary winding 124 of transformer T2 connected intermediate plates 126 and 127 of tube V1. The modulated waves, i. e., the tone signals, that appear across winding 124 are shown in Fig. 4. The necessary positive voltage is applied to plates 126 and 127 by means of a wire 128 which is connected, at one end, to the center-tap of winding 124, and, at its other end, to terminal 100. Cathode 129 of tube V1 is connected to a voltage divider network consisting of potentiometer 130 and resistors 131 and 132 in series circuit; said voltage divider network is connected, at one end, to terminal 100, and, at the other end, to terminal 101. The variable arm of potentiometer 130 is set so that tube V1 will be biased to permit undistorted conduction of the continuous audio waves generated by the said oscillator when the photoelectric tube P1 senses a dark area, but will cause a complete cut-off of tube V1 when the said photoelectric tube senses a light area.

Plate 136 of vacuum tube V4 is connected to the positive terminal 100 of voltage 99 through condenser 137 and primary winding 133 of transformer T3, whereas cathode 138 is connected to the aforedescribed voltage divider network intermediate resistors 131 and 132. Condenser 137 filters out any high frequency noise or radio frequency interference. The control grid 139 is coupled to secondary winding 125 of transformer T2 by means of a condenser 140 and a resistor 141 connected, at one end, to one plate of condenser 140, and, at its other end, to the center-tap of winding 125. In addition thereto, the said grid 139 is connected to cathode 109 of gas tube G1 through a resistor 150 and a wire 149 so that the bias voltage applied to tube V4 renders the tube conductive only so long as tube G1 is conducting. As the description advances, the preceding grid biasing circuit for tube V4 will be described in more detail.

The aforesaid audio frequency waves or tone signals corresponding to the code symbols scanned, and appearing across the upper one-half of secondary winding 125 are further amplified by tube V4 before being applied to the primary winding 133 of output transformer T3. The secondary winding 134 of the said transformer T3 is connected to a jack plug connector 135 through which the modulated output start-stop type tone signals may be fed over any communication channel to a suitable receiving device.

In keeping with the spirit of the invention, it should be apparent that any start-stop type signals keyed off and on by a photoelectric reading means may be transmitted from the signal transmitting photoelectric reader; e. g., direct current pulses corresponding to code symbol elements read.

The audio frequency carrier waves appearing across the lower one-half of winding 125 are rectified by a vacuum tube V3 connected as a half-wave rectifier. The direct current output of the said rectifier is filtered by resistors 142 and 143 and a condenser 144, and applied as a negative cut-off bias to the control grid 145 of gas tube G2. Whenever the end of a line of code symbol printing on the document 26 being scanned is reached, the photoelectric tube P1 sensing only the white surface of the said document conducts continuously, thereby applying a continuous negative cut-off bias to tube V1 due to the aforedescribed voltage drop across resistor 117 so as to render the said tube V1 non-conductive. Hence, the carrier frequency voltage generated by the said oscillator and normally amplified by tube V1 is cut off, and accordingly the carrier frequency voltage normally impressed across winding 124 of transformer T2 is cut off. Thus, the only bias applied to the control grid 145 of tube G2 is that supplied by the now discharging condenser 144 with the polarity indicated. The resistor-condenser combination 142, 143 and 144 is selected so as to have an RC time delay constant which will delay the firing of tube G2 for a period equal to approximately the time required to read one complete code symbol plus the normal spacing between code symbols. When condenser 144 has discharged sufficiently, tube G2 will fire and momentarily energize the platen indexing magnet coil 61 through a 2.75 microfarad capacitor 147 and line feed switch 146. Tube G2 will continue to conduct due to the positive potential applied to its plate 116 from terminal 100 through its load resistor 148. In addition thereto, when tube G2 fires, tube G1 is extinguished by means of a negative going voltage pulse transmitted through commutating condenser 115. This action de-energizes the coils 113 and 114 of the carriage disc clutch electromagnets 38 and 39, respectively, and allows the yielding carriage return mechanism to return carriage 32 to its starting position at the left terminus of the photoelectric reader.

It is evident that platen indexing coil 61 will not be energized when tube G2 fires if switch 146 is open. Nevertheless, carriage 32 will return to its starting position when carriage disc clutch coils 113 and 114 are de-energized. Thus, by maintaining switch 146 open, one line of code symbol printing may be scanned repeatedly.

As mentioned hereinbefore, cathode 109 of tube G1 is connected to the control grid 139 of tube V4 through wire 149 and resistor 150. During the time that tube G1 is conductive, tube V4 is biased so as to permit the aforementioned amplification of the modulated start-stop type tone signals appearing across winding 124. However, during the time that tube G1 is extinguished, i. e., during the return of carriage 32 to its starting position, the potential of cathode 109 is decreased sufficiently to bias grid 139 of tube V4 beyond cut-off. This prevents the transmission of any signals through jack 135 during the return of carriage 32 to the left terminus.

At the left terminus of the photoelectric reader, there are three carriage actuated contact switches 105, 106 and 107 as is shown in Figs. 6 and 9. The contact operating cams 151, 152 and 153 are attached to an extended member 154 of mount 30 by a plurality of adjusting screws.

Referring to Fig. 10, contact 105 is closed at the starting point and opens immediately after carriage 32 begins to move from left to right. The action of this contact provides automatic operation of the said carriage disc clutch when scanning lines of code symbol print successively or repeatedly because it completes the hereinbefore described circuit to the shield grid 104 of tube G1 in order to fire the said tube G1. In addition thereto, the said contact 105 allows tube G1 to fire only when the carriage 32 is positioned at the starting point, thereby assuring that the scanning process shall commence only at the beginning of a line of code symbol print.

Contact 106 is open at the starting position and closes as soon as the carriage 32 begins to move from left to right. The said contact 106 parallels switch 103 so that in the event switch 103 is turned off, i. e., opened, while the reading unit 28 is in the process of scanning a line of code symbol print, the said reading unit will complete scanning the said line of print before returning to its starting position. The light source 20 is connected, at one end, to terminal 102, and, at its other end, to switch 103 through a resistor 155. Thus, opening switch 103 while the reading unit 28 is scanning a line of print would, in the absence of the said contact 106, open the circuit to light source 20, and extinguish the photoelectric tube P1. The resulting absence of a voltage drop across the tube P1 load resistor 117 would permit tube V1 to conduct continuously and an undesirable and incorrect continuous carrier frequency tone signal would be transmitted from jack 135.

Contact 107 connected intermediate terminal 102 and control grid 145 is closed at the starting point and opens after the carriage 32 has moved to the right a distance equivalent to approximately six complete code symbols. Contact 107 parallels the grid bias supply for tube G2 formed by tube V3 and is employed to prevent the igniting of tube G2 before the voltage formed by tube V3 is sufficiently negative to bias tube G2 beyond cut-off. In the event that the line to be scanned is void of any printed code symbol material, tube G2 will fire when contact 107 opens, so that carriage 32 returns to its starting position at the left terminus while platen 90 is indexed one whole space.

Due to contact 107, the left margin of the lines of printed code symbols may lie anywhere between a line corresponding to the starting point of carriage 32, and a line corresponding to the point where the said contact opens.

The operation of the reading device 28 may be terminated, and the transmission of any tone signal from jack 135 may be prevented by opening switch 103. With carriage 32 at its starting position and switch 103 in the "off" position, tube G1 is rendered non-conductive due to a zero potential at its shield grid 104 and an open circuit to its control grid 191. Thus, coils 113 and 114 remain de-energized so as to maintain the said disc clutch inoperative. During the time that tube G1 is extinguished, the grid bias of tube V4 is driven beyond cut-off due to the decreased potential of cathode 109 of tube G1 so as to prevent the transmission of any tone signals from jack 135.

*Receiving distributor and recording unit*

As the receiving distributor and the recording unit per se form no part of this invention, they will be described only briefly. A detailed description of the receiving unit distributor shown in Fig. 11 may be found in U. S. Patent No. 2,456,825, issued to Clyde J. Fitch et al.

The output voltage of rectifier 156 is impressed across condenser 157, with the polarity indicated, and a voltage divider consisting of resistors 158, 159, 160, 161 and 162, and a potentiometer 163, in order to supply the required voltages to the various distributor unit tube circuits. The output voltage of rectifier 164 which is used as a bias supply, is impressed across a resistor 166 and a condenser 165 with the polarity indicated.

Figure 11:
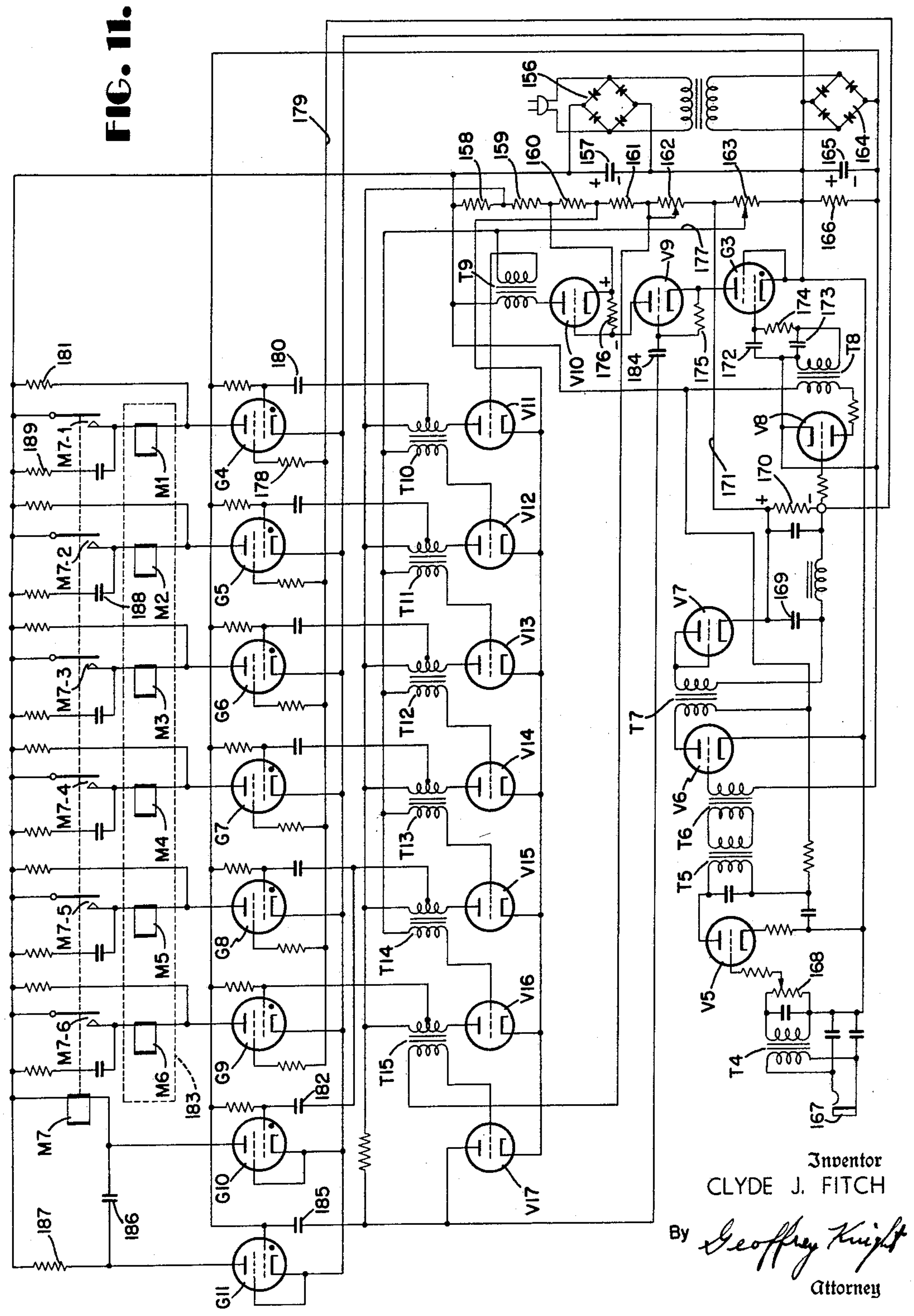
Fig. 11 is a schematic wiring diagram of the receiving unit distributor wherein the elements contained within the broken line 183 represent the control elements of a recording unit.

Tone signals, as shown in Fig. 4, transmitted from jack 135 (Fig. 10) and over any suitable communication channel, are fed into a jack 167. Referring to Fig. 11, the said signals are impressed, through a transformer T4 and a volume control 168, upon the grid of a vacuum tube V5. The plate circuit of tube V5 is coupled by transformers T5 and T6 to the grid circuit of a vacuum tube V6. The amplified output of tube V6 passes through transformer T7 to the plate and grid of a vacuum tube V7 hooked up as a half-wave rectifier. This tube V7 rectifies the incoming tone signal so that an equivalent direct current signal voltage appears across condenser 169 and across resistor 170 with the polarity indicated. In keeping with the spirit of the invention, it should be apparent that direct current signal voltage pulses keyed off and on so as to correspond to code symbol elements read may be applied directly across resistor 170.

The negative end of resistor 170 is connected to the grid of a vacuum tube V8, whereas the plate of tube V8 is connected to the primary coil of a transformer T8. The point intermediate resistors 162 and 163 to which the grid of tube V8 is connected through a wire 171 and a resistor 170, is at a potential which normally renders tube V8 conductive, thereby causing its plate current to pass through the primary winding of transformer T8. The start signal element (Fig. 4) of the said tone signal causes a voltage drop across resistor 170 with the polarity indicated so as to decrease the potential on the grid of tube V8 beyond cut-off and thereby render said tube V8 non-conductive.

The interruption of the said plate current through transformer T8 induces an E. M. F. in its secondary winding which is connected through an RC time delay circuit comprising condensers 172 and 173 and resistor 174 to the control grid of a gas tube G3. The grid of tube V9 is connected through a grid leak resistor 175 to its cathode so that tube V9 is accordingly normally conditioned to pass current. The voltage of the impulse induced in the secondary winding of transformer T8, when tube V8 is cut off by the start signal, is of such a magnitude and polarity to drive the control grid of gas tube G3 positive so as to fire tube G3.

The plate of a vacuum tube V10 is connected to the primary winding of a transformer T9, and its grid is connected to the plate of tube V9 and through a resistor 176 to its cathode. The said tube V10 is normally conductive. However, when tube G3 fires, current flows through resistor 176, causing a potential drop across the said resistor of the polarity indicated, so as to bias the tube V10 beyond cut-off. As the magnetic field of transformer T9 collapses, an E. M. F. is induced in its secondary winding so as to start the distributor unit sweep impulses to be described.

One end of the secondary winding of transformer T9 is connected by a wire 177 to a selected resistance point of potentiometer 163, whereas the other end of the said secondary winding is connected to the grid of the first vacuum tube of a series of sequentially connected vacuum tubes V11 through V17. The plates of tubes V11 through V16 are connected to the primary windings of related sequence transformers T10 through T15, respectively; the grids of tubes V12 through V16 are connected through the secondary windings of the said sequence transformers T10 through T14, respectively, and wire 177 to the movable arm of potentiometer 163. Normally, the grids of the tubes V11 through V17 are biased negatively by the setting of potentiometer 163 so that the said tubes are rendered non-conductive.

When a sweep is initiated, the series of tubes V11 through V17 becomes conductive in sequence, each tube returning to a non-conductive condition as the next tube becomes conductive. The tubes V11 through V16 pertain, respectively, to the six code symbol elements of one code symbol shown in Fig. 2. Tube V17 initiates restoration of the distributor sweep circuit.

The voltage induced in the secondary winding of transformer T9 when tube V10 is cut off, is of such polarity and amplitude as to swing the potential at the grid of tube V11 positive so as to render tube V11 conductive. The resulting plate current which flows through tube V11 and the primary winding of transformer T10 induces an E. M. F. in the secondary winding of transformer T10 which drives the grid of tube V12 more negative, therefore causing no change in the conductivity of the said tube V12. When the grid of tube V11 swings positive, a grid current flows through tube V11 and therefore retards the collapse of the magnetic field in transformer T9. When the potential at the grid of tube V11 drops below cathode potential and the said grid current ceases to flow, the magnetic field in the secondary winding of transformer T9 collapses suddenly so that tube V11 is cut off abruptly. The cessation of current through the primary winding of transformer T10 induces an E. M. F. in the secondary winding of transformer T10 which swings the potential of the grid of tube V12 above cathode potential, and tube V12 begins to conduct. Grid current flows through tube V12 and the secondary winding of transformer T10, delaying the collapse of the magnetic field in this transformer. When the potential on the grid of tube V12 passes below cathode potential and the said grid current ceases to flow, the magnetic field in the transformer T10 collapses suddenly, cutting off tube V12.

In a similar way the remaining series of sequentially connected tubes V13 through V17 becomes conductive in succession.

Associated with each tube V11 through V16 is a trigger gas tube G4 through G9, respectively, and preferably of the thyratron type. The bias voltage on the control grids of tubes G4 through G9 normally prevents these tubes from firing. The shield grids of the said tubes G4 through G9 are each connected through a current limiting resistor 178, wire 179, resistor 170 and wire 171 to a point intermediate resistors 162 and 163. The absence of a signal voltage across resistor 170 causes the bias voltage on the shield grids of tubes G4 through G9 to increase in order to allow these tubes to fire if the potential on their control grids is raised coincidently thereto to a suitable value; but the presence of a signal voltage across resistor 170 causes the bias voltage at the said shield grids to condition tubes G4 through G9 to be uninfluenced by any said positive impulses applied to their respective control grids. The circuit proportions are such that any signal which has sufficient amplitude to start the sweep will also have sufficient amplitude to bias the shield grids of tubes G4 through G9 to prevent them from being ignited by positive impulses applied to their control grids.

The control grid of each tube G4 through G9 is coupled by a condenser 180 to a tap on the primary coil of the related transformer T10 through T15. At successive times corresponding to each code signal element when current through the primary coils of transformers T10 through T15 stops, positive impulses are transmitted through the condensers 180 to the control grids of the tubes G4 through G9. If, at the time that the control grid of any one of these tubes receives such a positive impulse, the potential on the shield grid of the one said tube is high, due to an absence of a signal voltage across resistor 170, the said tube will be fired. For example, during the time of code signal element 1 for the character "B" (Fig. 4), there is a zero signal voltage across resistor 170, and the positive pulse transmitted through condenser 180 when the primary winding magnetic field of transformer T10 collapses, fires tube G4; its arc being held by a current limiting resistor 181. During the time of code signal element 2 (Fig. 4), a signal voltage across resistor 170 causes the shield grids of all of the tubes G4 through G9 to be biased to a potential which renders these tubes non-responsive to positive pulses applied to their control grids. Consequently, the positive pulse transmitted from the transformer T11 to the control grid of the tube G5 at this time does not fire tube G5. In a similar manner, as the remaining code signal elements are received through jack 167 for the character "B" (Fig. 4), the tubes G6 and G8 are not fired while the tubes G7 and G9 are fired. Thus, corresponding to the tone signal for the character "B" shown in Fig. 4, the tubes G4, G6 and G8 remain conductive at the end of the distributor circuit sweep, and the tubes G5, G7 and G9 remain non-conductive.

The positive pulse transmitted to the control grid of tube G8 is also transmitted to the control grid of tube G10 through condenser 182 in order to fire the said tube G10 so as to energize the relay coil M7.

The normally open contacts M7–1 to M7–6 of the relay M7 close at about the time of code signal element 6 due to the time required for the relay M7 to pick up. When this occurs, circuits are extended from the plates of the tubes G4 through G9 through related control magnets M1 through M6. Only the control magnets connected to the plates of tubes which have been fired will be energized; in the example given for the character "B," the coils of magnets M1, M3 and M5. The control magnets within the broken line 183 may be the selector magnets of the printer recording unit shown in U. S. Patent No. 2,181,940, issued to Clyde J. Fitch et al. When they are energized, the recording unit represented within the broken line 183 prints a character or executes a function corresponding to the tone signal received; in the particular example cited, the recording unit would print the letter "B."

When tube V17 becomes conductive due to the collapse of the magnetic field set up by the primary winding of transformer T15, a negative going pulse is transmitted through a condenser 184 to the grid of tube V9, rendering tube V9 non-conductive. This opens the circuit through tube G3 so that its arc is extinguished, thereby restoring the starting circuit to a normal condition.

When tube V17 becomes extinguished, a positive pulse is transmitted through a condenser 185 to the control grid of gas tube G11, rendering the said tube G11 conductive. Tube G10 is extinguished by a negative going pulse through commutating condenser 186 when tube G11 fires, thereby de-energizing relay coil M7. Thus, any energized control magnets M1 through M6 are de-energized when the contacts M7–1 to M7–6 open. The inductance of the relay coil M7 together with condenser 186 and resistor 187 form an oscillatory circuit so that when relay coil M7 is de-energized, an oscillation is set up, the first negative wave of which is sufficient to extinguish tube G11.

Similarly, oscillatory circuits are formed by the magnet coils M1 through M6, condensers 188, and resistors 189 and 181 so that when any of the magnet coils M1 through M6 are de-energized, oscillatory currents are set up in their respective oscillatory circuits, the first negative waves of which extinguish their respective gas tubes G4 through G9. The receiving unit distributor and the recording unit are thereby restored to a normal condition, ready to receive the next tone signal impulse.

The entire receiver circuit is restored within a time duration of one code signal element so that the stop signal may be as short as one code signal element. However, the preferred time duration as shown in Fig. 4 is 1½ code signal elements.

A requirement for the proper operation of the receiving distributor and the recording unit is the maintenance of a predetermined time duration for the individual start, stop and code signal elements which make up a complete tone signal. It is evident from a reading of the receiving unit distributor description that the sequential signal elements making up each character or functional tone signal transmitted from jack 135 (Fig. 10) must be in synchronism with the sequential sweep of the receiving unit distributor (Fig. 11).

The above mentioned synchronism is acquired and maintained by the transmission of tone signals in which the time duration for the start and individual code signal elements corresponds to the time duration for each element of the receiving unit distributor sequential sweep.

Inspection of Fig. 2 will show that the predetermined width of the printed start mark element is equal to the predetermined width of each of the six code symbol elements. Since carriage 32 scans each line of printed code symbols at a continuous and uniform predetermined rate of speed as described hereinbefore, each of the sequential code signal elements included in a tone signal has a time duration corresponding to the time duration required to condition each one of the sequentially connected tubes V11 through V16 for conduction. The width of the stop mark spacing is 1½ code mark elements in order to allow restoration of the entire receiving unit circuit before the transmission of a subsequent tone signal.

While there have been shown and described and pointed out the fundamental novel features of the invention as applied to a preferred embodiment, it will be understood that various omissions and substitutions and changes in the form and details of the device may be made by those skilled in the art, without departing from the spirit of the invention. It is the intention, therefore, to be limited only as indicated by the scope of the following claims.

What is claimed is:

1. In a device for transmitting combinational code signals to a sequential sweep distributor comprising a sweep start circuit responsive to a start signal for initiating an operation of a sweep circuit including a set of sequentially connected vacuum tubes, one for each code element, each said tube successively conditioned for conduction in sequential order for each operation of said sweep circuit; a signal source, a signal output means, a document having code symbols thereon representing characters and functions, said code symbols each comprising a plurality of code symbol elements preceded by a start element, a carriage including photoelectric means for scanning said code symbols, keying means controlled by said photoelectric means for controlling said signal output means, and means for advancing said carriage at a continuous and uniform rate of speed so as to transmit signal elements corresponding to said code symbol elements in synchronism with said conditioning of said sequentially connected vacuum tubes.

2. In a device for transmitting combinational code tone signals to a sequential sweep distributor comprising a sweep start circuit responsive to a start signal element for initiating an operation of a sweep circuit including a set of sequentially connected vacuum tubes, one for each code element, each said tube successively conditioned for conduction in sequential order for each operation of said sweep circuit; an oscillator for generating tone signals, a tone signal output means, a document having code symbols thereon representing characters and functions, said code symbols each comprising a plurality of code symbol elements preceded by a start element, a carriage including photoelectric means for scanning said code symbols, modulating means controlled by said photoelectric means for controlling said tone signal output means, and means for advancing said carriage at a continuous and uniform rate of speed so as to transmit code signal elements corresponding to said code symbol elements in synchronism with said conditioning of said sequentially connected vacuum tubes.

3. In a reading device of the character described; a document having code symbols thereon in a transverse line; a carriage including photoelectric means for scanning said code symbols; a yielding carriage return mechanism; a carriage actuating means; a clutch mounted on said carriage for movement therewith; a document indexing means for line spacing said document; a source of voltage; two gaseous trigger tubes, each having at least an anode, a cathode and a grid connected to said source of voltage; the anode connection of the first one of said tubes including a first magnet coil for controlling said clutch; the anode connection of the second one of said tubes including a second magnet coil for controlling said document indexing means; a condenser connecting said anodes for alternately extinguishing said tubes; means for igniting said first tube so as to energize said first magnet coil, thereby rendering said clutch operative so that said carriage actuating means advances said carriage; and means for igniting said second tube so as to energize said second magnet coil, thereby rendering said document indexing means operative; said preceding means causing said first magnet coil to de-energize so as to render said clutch inoperative whereby said yielding carriage return mechanism returns said carriage to a starting point.

4. A device as described in claim 3 including means for returning said carriage to a starting point after scanning a line of said code symbols, and means for suppressing the transmission of said code tone signals during the return of said carriage.

5. In a device for transmitting combinational code signals to a sequential sweep distributor comprising a sweep start circuit responsive to a start signal for initiating an operation of a sweep circuit including a set of sequentially connected vacuum tubes, one for each code element, each said tube successively conditioned for conduction in sequential order for each operation of said sweep circuit; a combinational code signal source having a signal output means, a document with code symbols thereon to represent characters and functions, said code symbols each including a plurality of code symbol elements preceded by a start symbol element representing said start signal, a carriage including photoelectric means, keying means controlled by said photoelectric means for controlling said signal source, means operatively connecting said signal output means and said sequential sweep distributor, and means for advancing said carriage so that said photoelectric means scans said code symbols at a continuous and uniform rate of speed to thereby cause said signal output means to transmit to said sequential sweep distributor signal elements corresponding to said code symbol elements in synchronism with said conditioning of said sequentially connected vacuum tubes.

6. In a device for transmitting combinational code tone signals to a sequential sweep distributor comprising a sweep circuit including a set of sequentially connected vacuum tubes, one for each code element, each said tube successively conditioned for conduction in a sequential order for operation of said sweep circuit, and a sweep start circuit responsive to a start signal element for initiating an operation of said sweep circuit; an oscillator for generating tone signals having a tone signal output means, a document with code symbols thereon to represent characters and functions, said code symbols each including a plurality of code symbol elements preceded by a start symbol element representing said start signal element, a carriage including photoelectric means, modulating means controlled by said photoelectric means for controlling said oscillator, means operatively connecting said tone signal output means and said sequential sweep distributor, and means for advancing said carriage so that said photoelectric means scans said code symbols at a continuous and uniform rate of speed, to thereby cause said tone signal output means to transmit to said sequential sweep distributor code tone signal elements corresponding to said code symbol elements in synchronism with said conditioning of said sequentially connected vacuum tubes.

References Cited in the file of this patent

UNITED STATES PATENTS

| | | |
|---|---|---|
| 1,753,961 | Zworykin | Apr. 8, 1930 |
| 2,274,737 | Potts | Mar. 3, 1942 |
| 2,307,099 | Apperley | Jan. 5, 1943 |
| 2,380,666 | Morrison | July 31, 1945 |
| 2,382,251 | Parker et al. | Aug. 14, 1945 |
| 2,468,462 | Rea | Apr. 26, 1949 |
| 2,586,711 | Potts | Feb. 19, 1952 |
| 2,592,779 | Wise et al. | Apr. 15, 1952 |